United States Patent [19]
Tanibata

[11] Patent Number: 5,337,119
[45] Date of Patent: Aug. 9, 1994

[54] IMAGE COMBINING PRINTER

[75] Inventor: Tohru Tanibata, Wakayama, Japan

[73] Assignee: Noritsu Koki Co., Ltd., Wakayama, Japan

[21] Appl. No.: 60,063

[22] Filed: May 13, 1993

[30] Foreign Application Priority Data

May 21, 1992 [JP] Japan ................... 4-128895

[51] Int. Cl.⁵ .............................................. G03B 27/52
[52] U.S. Cl. ........................................ 355/40; 355/19; 355/39
[58] Field of Search ................ 354/75; 355/19, 28, 355/29, 39, 40

[56] References Cited

U.S. PATENT DOCUMENTS

| | | | |
|---|---|---|---|
| 4,634,269 | 1/1987 | Welp et al. | 355/100 |
| 4,711,565 | 12/1987 | Franchina et al. | 355/39 |
| 4,712,909 | 12/1987 | Oshikoshi | 355/40 X |
| 4,757,352 | 7/1988 | Weinzierl et al. | 355/40 |
| 4,929,972 | 5/1990 | Anderson et al. | 354/75 |
| 5,068,742 | 11/1991 | Oshikoshi et al. | 355/40 X |
| 5,072,253 | 12/1991 | Patton | 355/40 |
| 5,077,573 | 12/1991 | Murayama et al. | 355/40 |
| 5,274,418 | 12/1993 | Kazami et al. | 355/40 |
| 5,287,141 | 2/1994 | Yoshikawa | 355/40 |

*Primary Examiner*—Richard A. Wintercorn
*Attorney, Agent, or Firm*—Wenderoth, Lind & Ponack

[57] ABSTRACT

The feeding of a photosensitive material is automatically controlled to a desired length corresponding the size or volume of an additional image to be printed so that manual data input operations can be minimized. The volume of the additional image is estimated from attribute data detected by an attribute data detector and used for determining the location of printing the image on the photo-sensitive material. Also, the orientation of the image to be printed is determined from data of a vertical position detector. With reference to those information, the length of feeding and the location of cutting marks for the photosensitive material are calculated. Resultant signals are fed to a double exposure means, a cutting-mark applying means, and a photosensitive material transfer means for optimum control of exposure actions.

24 Claims, 2 Drawing Sheets

IMAGE COMBINING PRINTER

BACKGROUND OF THE INVENTION

The present invention relates to an image combining printer.

Some conventional image combining printers have been provided for producing e.g. picture post-cards or combination prints which contain photographic pictures and their relevant characters, symbols, and/or markings- Such a conventional image combining printer is arranged such that the volume or presence of an additional image, e.g. a message of characters, is first examined and its information is used for setting a feeding of the photosensitive material of long tape shape with a manually operated entry device.

It will however take a considerable length of time for the conventional image combining printer to manually input the data of e.g. a volume of the message to be printed after examining it.

SUMMARY OF THE INVENTION

It is an object of the present invention, in view of the foregoing, to provide an image combining printer capable of automatically determining a feeding of the photosensitive material in accordance with the volume of an additional image to be printed, e.g. a message, without use of any manual data entry device.

An image combine printer according to the present invention, comprises: a transfer means for driving a photosensitive material of long tape shape; an exposure means for exposing the photosensitive material to an original image projected from a negative film; an attribute information detecting means for detecting an attribute data, e.g. shooting date or a message, from the negative film; a pattern determining means for determining a pattern of e.g. characters, symbols, or markings, to be printed which represents the attribute data of the attribute information detecting means; a double exposure means for exposing the photosensitive material to the pattern produced by the pattern determining means; a vertical position detecting means for detecting the upward and downward or vertical position data of the original image from the negative film; a vertical position determining means for determining the vertical position of the original image from the vertical position data of the vertical position detecting means; and a cutting-mark applying means for applying cutting-marks to the photosensitive material. In particular, the double exposure means, the cutting-mark applying means, and the transfer means are controlled by a controller which estimates the location of the pattern of the attribute data relative to the original image on the photosensitive material for printing from the attribute data detected by the attribute information detecting means, and also estimated the orientation of the pattern from the vertical position data of the vertical position detecting means, and from those estimations, determines a length of feeding and a timing of cutting-mark application for the photosensitive material.

Another image combing printer is characterized in that both the length of feeding and the timing of cutting-mark application are automatically determined by the controller according to the size or volume of the pattern to the transfer means and the cutting-mark applying means respectively for optimum actions.

A further image combining printer, is characterized in that a pattern of an extra data input for combination printing can be printed on the photosensitive material.

A still further image combining printer 4 of this specification, similar to that of claim 1, 2 or 3, is characterized in that the pattern to be printed can be varied in color during the double exposure action.

A still further image combining printer depicted in claim 5 of this specification, similar to that of claim 1, 2, 3, is characterized in that the double exposure means has a PLZT head of linear shape extending at a right angle to a pass line of the photosensitive material and arranged for performing a line exposure on the photosensitive material during its running.

A still further image combining printer is characterized in that the double exposure means is an exposure device using a CRT.

In the operation of the image combining printer of the present invention, the location of the pattern of the attribute data relative to the original image on the photosensitive material for printing is estimated from the attribute data detected by the attribute information detecting means, and the orientation of the pattern is also estimated from the vertical position data of the vertical position detecting means. Then, from those estimations, the length of feeding and the timing of cutting-mark application for the photosensitive material are determined and used for controlling the actions of the double exposure means, the cutting-mark applying means, and the transfer means. As the result, the feeding of the photosensitive material can automatically be controlled to a desired length corresponding to the size or volume of the pattern of the attribute data and the vertical position data of the original image in the negative film.

Also, any pattern of wanted data can be processed and printed by the same double exposure action.

DETAILED DESCRIPTION OF THE PREFERRED EMBODIMENT

A preferred embodiment of the present invention will be described in the form of an image combine printer referring to the accompanying drawings.

Figure 1:
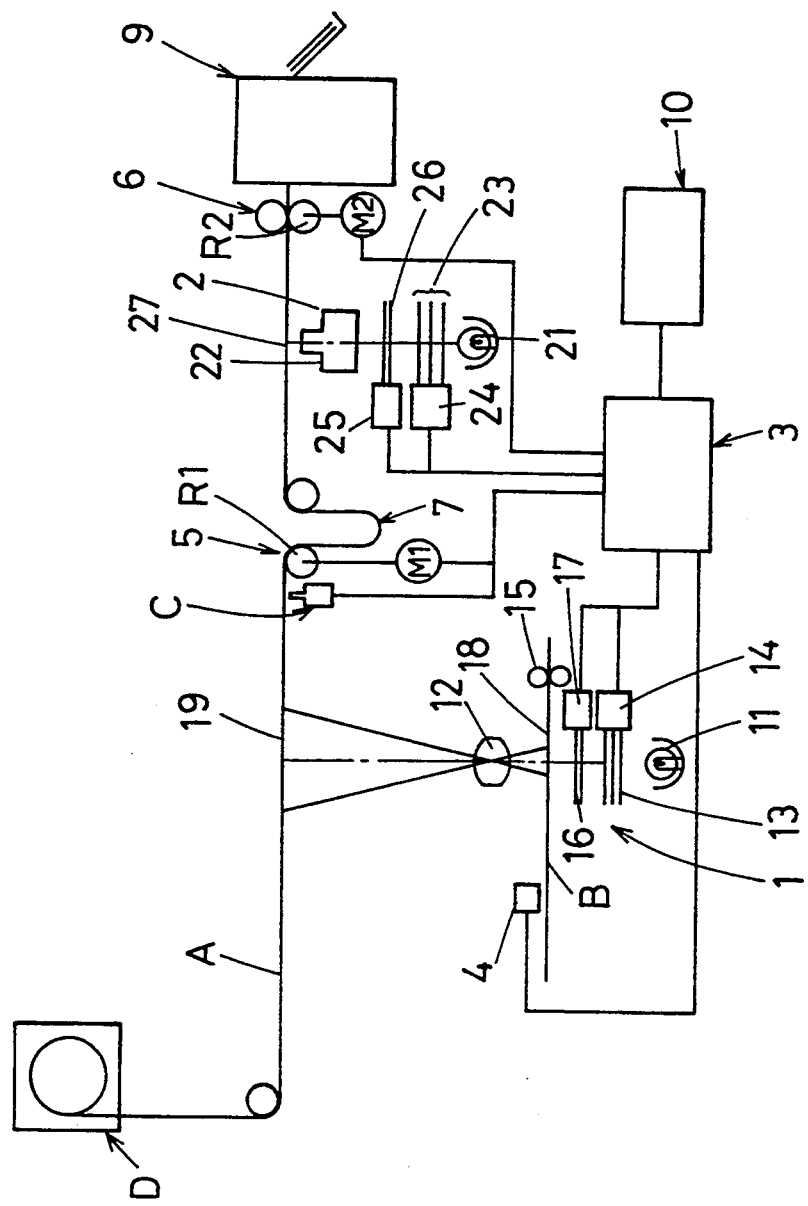
FIG. 1 is a schematic view of an image combining printer according to the present invention.

FIG. 1 shows a schematic view of the image combine pr inter in which an exposure means 1 , a double exposure means 2, and a cutting-mark applying means C are arranged across the pass line along which a photosensitive material A of long tape shape is transferred.

The photosensitive material A is unloaded from a magazine D where it is installed in a roll and transferred by the action of a driving means 5 which contains a transfer roller unit R1 driven by an advance motor M1.

Also, another driving means 6 containing a transfer roller unit R2 driven by an advance motor M2 is provided between the double exposure means 2 and a chemical processing unit 9.

A loop station 7 is arranged between the cutting-mark applying means C and the double exposure means 2 where the photosensitive material A runs in a loop after exposed to an original image A1 for projection printing at the exposure means 1 and accompanied with cutting marks at the cutting-mark applying means C.

The cutting-marks are indications for cutting a tape of the photosensitive material A into pieces or individual prints after completion of the chemical processing.

The exposure means 1 comprises a light source 11, a lens 12, a light modulation filter unit 13 arranged across the light path between the light source 11 and the negative film B for advancing into and retracting from the light path, a light modulation filter driving means 14 for controlling the movement of the light modulation filter unit 13, a mechanical shutter 16 arranged for mechanically closing the light path between the light source 11 and the light modulation filter unit 14 in response to a command signal from a controller 3 described later in order to pass a desired tone of light, and a mechanical shutter driving mechanism 17. In action, the photosensitive material A halted at an exposure station 19 is exposed to a photographic or original image A1 which is projected from the negative film B by illumination of the light source 11.

The negative film B is driven by a transfer roller unit 15 to a projection station 18 of the exposure means 1 for optical projection.

The double exposure means 2 comprises a light source 21, a PLZT head 22 of linear shape extending at a right angle to the pass line of the photosensitive material A, a light modulation filter unit 23, a light modulation filter driving means 24 for actuating the light modulation filter unit 23 to advance to and retract from the light path between the light source 21 and the PLZT head 22, a mechanical shutter 26 arranged for mechanically closing the light path between the light source 21 and the PLZT head 22, and a mechanical shutter driving mechanism 25. The PLZT head 22 is arranged to receive light from the light source 21 through the light modulation filter unit 23. Accordingly, the double exposure means 2 allows the transferring photosensitive material A to be line exposed to an additional image A2, e.g. a message or relevant information of characters and symbols, with a variation of color.

The PLZT head 22 comprises layers of an analyzer, a PLZT crystal, and a polarizer, in which the analyzer is covered with a selfoc lens-eye.

The double exposure means 2 may be an exposure device using a CRT.

Also, denoted by 4 is a vertical position and attribute data detecting means for reading a vertical position data for upward and downward information of the original image and an attribute data, e.g. shooting date or a message, from the negative film B and sending them as electric signals to the controller 3.

The controller 3 contains a pattern examining means 31, a pattern exposure controlling means 32, and vertical position determining means 33 accompanied with a main unit 3A.

The pattern examining means 31 examines a pattern of the additional image A2, e.g. characters, symbols, or markings, to be printed to the photosensitive material A from the attribute data read out by the vertical position and attribute data detecting means 4. The pattern exposure controller means 32 instructs the double exposure means 2 to perform an exposure to the additional image A2 at optimum conditions determined by the pattern examining means 31. The vertical position determining means 33 determines the vertical position of the original image A1 from the vertical position data recorded on the negative film B and retrieved by the vertical position and attribute data detecting means 4.

The main unit 3A of the controller 3 estimates the volume of the additional image A2 from the attribute data of the vertical position and attribute data detecting means 4 and determines a printing position on the photosensitive material A to correspond to the vertical position of the original image A1. Then, it calculates a length of feeding of the photosensitive material A and determines a timing of application of cutting-marks before sending their information as command signals to a motor M2 of the transfer roller unit 6 and a cutting-mark applying means C respectively.

Also, a data entry device 10 is provided for entry of a data for an exposing position and a color of the additional image A2 relative to the original image A1 on the photosensitive material A. The data is thus fed to the controller 3 for controlling the action of the exposure means 2.

Any other image may be created and input by the entry device 10 to the controller 3 for combination printing.

The printing action of the image combine printer of the present invention will now be explained.

The vertical position data and the attribute data, shooting data and/or a message, recorded on the negative film B are read with the vertical position and attribute data detecting means 4 and fed as electric signals to the controller 3.

While the negative film B is driven to the projection station 18, the photosensitive material A is unloaded from a magazine D and transferred to the exposure station 17 of the exposure means 1 for exposure action.

In response to the data of the vertical position and attribute data detecting means 4, the controller 3 sends command signals to the motor M2 of the transfer roller means 6 and the cutting-mark applying means C for application of cutting-marks to the photosensitive material A.

In sequence, the photosensitive material A after exposed to the original image A1 at the exposure means 1 and provided with cutting marks at the cutting-mark applying means C is transferred further to a line exposure station 27 of the double exposure means 2.

Again, the controller 3 delivers command signals based on the vertical position data and the attribute data of the original image A1, and the exposing position and color of the additional image A2 for printing on the photosensitive material A for optimum double exposure action. Accordingly, the photosensitive material A while being driven by the motor M2 is line exposed by the PLZT head 22 of the double exposure means 2 for attribute data printing.

Figure 2:
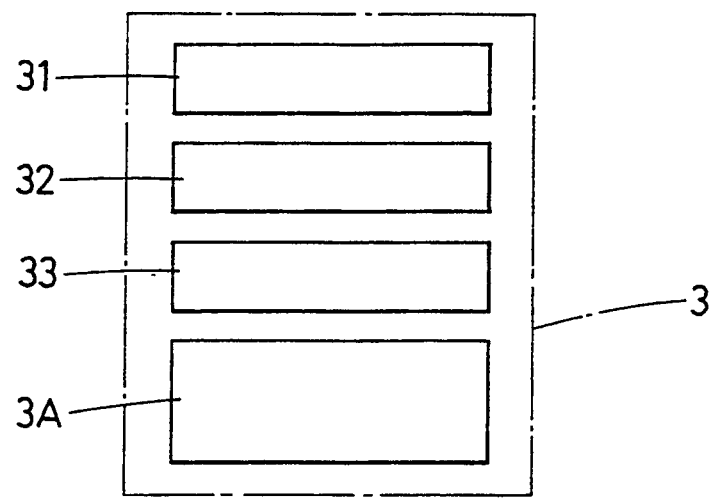
FIG. 2 is a block diagram of a controller in the image combining printer of the present invention.
Figure 3:
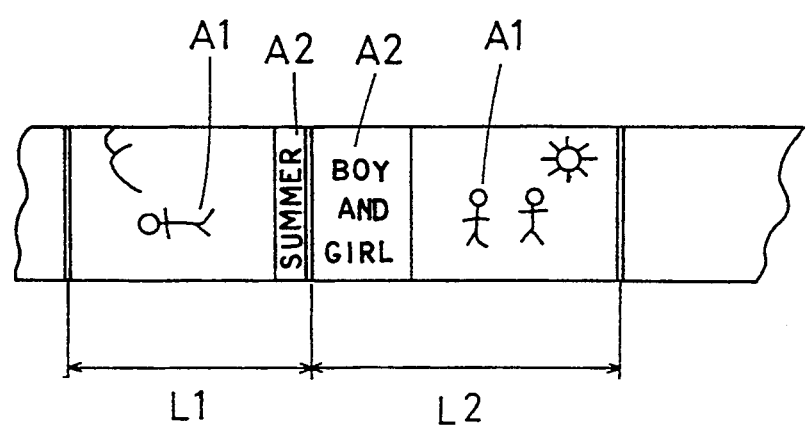
FIG. 3 is a plan view of a photosensitive material exposed two times in the image combining printer of the present invention.

FIG. 2 shows an image combination print produced by the double exposure action in which L1 and L2 represent the lengths of feeding.

Although this embodiment employs the negative film B as a recording medium for printing information on the photosensitive material, other mediums such as positive films or transparencies will an used with equal success.

What is claimed is:
1. An image combining printer comprising:
a transfer means for driving a photosensitive material of long tape shape;
an exposure means for exposing the photosensitive material to an original image projected from a negative film;

an attribute information detecting means for detecting an attribute data, which may include shooting data or a message, from the negative film;

a pattern determining means for determining and producing a pattern which may include characters, symbols, or makings, to be printed which represents the attribute data detected by the attribute information detecting means;

a double exposure means for exposing the photosensitive material to the pattern produced by the pattern determining means;

a vertical position detecting means for detecting the upward and downward or vertical position data of the original image from the negative film;

a vertical position determining means for determining the vertical position of the original image from the vertical position data of the vertical position detecting means;

a cutting-mark applying means for applying-marks to the photosensitive material; and a controller for controlling the double exposure means, the cutting-mark applying means, and the transfer means, for estimating the location of the pattern of the attribute data relative to the original image on the photosensitive material for printing from the attribute data detected material for printing from the attribute data detected by the attribute information detecting means, and for also for estimating the orientation of the pattern from the vertical position data of the vertical position detecting means, and from those estimations, determined a length of feeding and a timing of cutting-mark application for the photosensitive material.

2. An image combining printer as recited in claim 1, wherein said controller further comprises a means for determining and transmitting both the length of feeding and the timing of cutting-mark application according to the size or volume of the pattern to the transfer means and the cutting-mark applying means respectively.

3. An image combining printer as recited in claim 1, wherein a pattern of an extra data input for combination printing is printed on the photosensitive material.

4. An image combining printer as recited in claim 1, wherein the pattern to be printed is varied in color during the double exposure action.

5. An image combining printer as recited in claim 1, wherein the double exposure means has a PLZT head of linear shape extending at a right angle to a pass line of the photosensitive material and is arranged for performing a line exposure on the photosensitive material during its running.

6. An image combining printer as recited in claim 1, wherein the double exposure means is an exposure device using a CRT.

7. An image combining printer as recited in claim 2, wherein a pattern of an extra data input for combination printing is printed on the photosensitive material.

8. An image combining printer as recited in claim 2, wherein the pattern to be printed is varied in color during the double exposure action.

9. An image combining printer as recited in claim 3, wherein the pattern to be printed is varied in color during the double exposure action.

10. An image combining printer as recited in claim 7, wherein the pattern to be printed is varied in color during the double exposure action.

11. An image combining printer as recited in claim 2, wherein the double exposure means has a PLZT head of linear shape extending at a right angle to a pass line of the photosensitive material and is arranged for performing a line exposure on the photosensitive material during its running.

12. An image combining printer as recited in claim 3, wherein the double exposure means ha a PLZT head of linear shape extending at a right angle to a pass line of the photosensitive material and is arranged for performing a line exposure on the photosensitive material during its running.

13. An image combining printer as recited in claim 4, wherein the double exposure means has a PLZT head of linear shape extending at a right angle to a pass line of the photosensitive material and is arranged for performing a line exposure on the photosensitive material during its running.

14. An image combining printer as recited in claim 7, wherein the double exposure means has a PLZT head of linear shape extending at a right angle to a pass line of the photosensitive material and is arranged for performing a line exposure on the photosensitive material during its running.

15. An image combining printer as recited in claim 8, wherein the double exposure means has a PLZT head of linear shape extending at a right angle to a pass line of the photosensitive material and is arranged for performing a line exposure on the photosensitive material during its running.

16. An image combining printer as recited in claim 9, wherein the double exposure means has a PLZT head of linear shape extending at a right angle to a pass line of the photosensitive material and is arranged for performing a line exposure on the photosensitive material during its running.

17. An image combining printer as recited in claim 10, wherein the double exposure means has a PLZT head of linear shape extending at a right angle to a pass line of the photosensitive material and is arranged for performing a line exposure on the photosensitive material during its running.

18. An image combining printer as recited in claim 2, wherein the double exposure means is an exposure device using a CRT.

19. An image combining printer as recited in claim 3, wherein the double exposure means is an exposure device using a CRT.

20. A image combining printer as recited in claim 4, wherein the double exposure means is an exposure device using a CRT.

21. An image combining printer as recited in claim 7, wherein the double exposure means is an exposure device using a CRT.

22. An image combining printer as recited in claim 8, the double exposure means is an exposure device using a CRT.

23. An image combining printer as recited in claim 9, wherein the double exposure means is an exposure device using a CRT.

24. An image combining printer as recited in claim 10, wherein the double exposure means is an exposure device using a CRT.

* * * * *